(12) United States Patent
Pollock et al.

(10) Patent No.: US 8,766,571 B2
(45) Date of Patent: Jul. 1, 2014

(54) METHOD AND APPARATUS FOR CONTROLLING AN ELECTRICAL MACHINE

(75) Inventors: Charles Pollock, Oakham (GB); Helen Pollock, Oakham (GB)

(73) Assignee: Technelec Ltd., Oakham (GB)

( * ) Notice: Subject to any disclaimer, the term of this patent is extended or adjusted under 35 U.S.C. 154(b) by 0 days.

(21) Appl. No.: 14/007,321

(22) PCT Filed: Mar. 26, 2012

(86) PCT No.: PCT/GB2012/050658
§ 371 (c)(1),
(2), (4) Date: Nov. 14, 2013

(87) PCT Pub. No.: WO2012/131344
PCT Pub. Date: Oct. 4, 2012

(65) Prior Publication Data
US 2014/0084821 A1    Mar. 27, 2014

(30) Foreign Application Priority Data
Mar. 25, 2011 (GB) .................................. 1105093.7

(51) Int. Cl.
*H02P 21/00* (2006.01)
(52) U.S. Cl.
USPC ............ 318/400.02; 318/400.01; 318/400.09; 318/400.11; 318/700
(58) Field of Classification Search
USPC ............. 318/400.01, 400.02, 400.09, 400.11, 318/700
See application file for complete search history.

(56) References Cited

U.S. PATENT DOCUMENTS

| 2009/0030645 A1* | 1/2009 | Gotz et al. ..................... 702/147 |
| 2009/0146592 A1* | 6/2009 | Tobari et al. ............. 318/400.02 |
| 2011/0285332 A1* | 11/2011 | Pollock et al. ........... 318/400.02 |
| 2014/0042940 A1* | 2/2014 | Pollock et al. ........... 318/400.04 |

FOREIGN PATENT DOCUMENTS

| EP | 1852967 A1 | 11/2007 |
| GB | 2390767 A | 1/2004 |
| GB | 2465379 A | 5/2010 |

OTHER PUBLICATIONS

PCT International Preliminary Report on Patentability, PCT Application No. PCT/GB2012/050658, Oct. 1, 2013, 7 pages.
PCT International Search Report and Written Opinion, Application No. PCT/GB2012/050658 dated Jun. 7, 2013, 11 pages.
GB Search Report, Application No. 1105093.7, dated Aug. 5, 2011, 1 page.

\* cited by examiner

*Primary Examiner* — Kawing Chan
(74) *Attorney, Agent, or Firm* — Fenwick & West LLP

(57) ABSTRACT

An observer (404), operating during a time when open loop control (402) is being used to drive a synchronous motor (401), the output of the observer (404) being a signal, E_I_angle, related to the angle between a rotational EMF vector and the current excitation vector, the observer (404) determining the angle by an iterative calculation incorporating a summation term, the summation term summing the variation of the quadrature component of a rotational EMF vector relative to an estimated EMF position vector, and using the angle output of the observer to update the estimate of the rotational EMF position vector. In a further aspect of the invention the observer output signal, E_I_angle, can be used to determine the transition to closed loop control (405), when the observer output signal reaches a value indicating conditions close to pull out conditions.

19 Claims, 6 Drawing Sheets

METHOD AND APPARATUS FOR CONTROLLING AN ELECTRICAL MACHINE

RELATED APPLICATIONS

This application is a 35 U.S.C. 371 national stage filing of International Application No. PCT/GB2012/050658, filed on Mar. 26, 2012, which claims priority to United Kingdom Patent Application No. 1105093.7, filed on Mar. 25, 2011.

TECHNICAL FIELD

This invention relates to the control of electrical machines. More specifically, the invention relates to, but is not limited to, the control of brushless synchronous electrical machines when operating in the lower part of their speed range.

BACKGROUND

The speed range of an electrical machine is determined by many factors, including but not limited to, pole number, turns per phase and supply voltage. Brushless electronically commutated synchronous motors include permanent magnet brushless dc and brushless ac, synchronous reluctance, flux switching and switched reluctance motors.

An electronically commutated motor relies on knowledge of the position of the rotor to correctly excite particular phase windings in the motor to deliver torque of the required magnitude and direction. This rotor position information can be obtained by using methods to detect the rotational EMF in the motor windings. Such methods are known as sensorless commutation methods because they do not rely on sensors to detect the angular position of the shaft of the motor. These methods are common and work effectively at high speeds but deteriorate at low speeds. This is due to the decrease in the value of the rotational EMF, reducing the signal to noise ratio to a level which makes it difficult to use the data for closed loop position control or electronic commutation. In such motors it is common to drive the motor in the lower part of the speed range by exciting the stator phase windings with maximum current at a driven frequency. This method is known in the prior art as driving the motor in an open loop manner. Open loop methods are commonly used to start a motor, increasing the frequency until the EMF can be detected and a reliable transition to sensorless control can be made. Such systems are however "unintelligent" in that the transition to the sensorless method will typically be made at a fixed speed. This can lead to destabilising effects since the decision does not take account of the effect of the load. A machine driven in open loop will typically have an excess of current relative to the current needed to run with closed loop electronically commutated control. Once the electronic commutation becomes dependent on knowledge of the machine position, the torque can increase rapidly as the higher open loop current levels are brought into correct alignment with the motor EMF. The rapid increase in torque can cause a speed oscillation.

SUMMARY

Disclosed herein is an observer, operating during a time when open loop control is being used to drive a synchronous motor, the output of the observer being a signal, E_I_angle, related to the angle between a rotational EMF vector and the current excitation vector, the observer determining the angle by an iterative calculation incorporating a summation term, the summation term summing the variation of the quadrature component of a rotational EMF vector relative to an estimated EMF position vector, and using the angle output of the observer to update the estimate of the rotational EMF position vector.

Optionally, the observer output signal, E_I_angle, can be used to determine the transition to closed loop control, when the observer output signal reaches a value indicating conditions close to pull out conditions.

Optionally, the observer output signal, E_I_angle, is used as a torque monitoring system for an open loop driven synchronous motor, such that during relatively low levels of load torque, indicated by a large angle between the rotational EMF vector and the current excitation vector, the magnitude of the current excitation vector is decreased or during relatively high levels of load torque, indicated by a small angle between the rotational EMF vector and the current excitation vector, the magnitude of the current excitation vector is increased.

Optionally, the observer output signal, E_I_angle, is used as a torque monitoring system for an open loop driven synchronous motor, such that during relatively low levels of load torque, indicated by a large angle between the rotational EMF vector and the current excitation vector, the magnitude of the current excitation vector is progressively decreased until the observer output signal, E_I_angle, reaches a value indicating conditions close to pull out conditions, and a smooth transition to closed loop control can be initiated.

According to the invention in a first aspect, there is provided a control system for an electrical machine, and comprising: an observer configured to operate during a time when open loop control is being used to drive an electrical machine, and further configured to output a signal, E_I_angle, related to the angle between a rotational EMF vector and a current excitation vector provided by an inverter configured to control an electrical machine, wherein the observer is configured to determine the angle by an iterative calculation comprising a summation term, the summation term summing the variation of a quadrature component of the rotational EMF vector relative to an estimated EMF position vector, and wherein the controller system is configured to use the angle output by the observer to update the estimated angular position of the rotational EMF position vector.

It is noted that, following the first iteration of the iterative calculation, the estimated EMF position vector may be the EMF position updated during the previous iteration. On start-up, i.e. during the first iteration of the iterative calculation method, an initial estimation of the EMF position vector may be used and may be determined from another source.

Optionally, the observer is configured to use the output signal, E_I_angle, to determine the time of transition to closed loop control, when the observer output signal reaches a value below a threshold value indicating conditions close to pull out conditions.

Optionally, the observer is configured to use the output signal, E_I_angle, as a torque monitoring system for an open loop driven electrical machine, such that during relatively low levels of load torque, indicated by a large angle between the rotational EMF vector and the current excitation vector, the observer is configured to instruct the inverter to decrease the magnitude of the current excitation vector.

Optionally, the observer is configured to use the output signal, E_I_angle, as a torque monitoring system for an open loop driven electrical machine, such that during relatively high levels of load torque, indicated by a small angle between the rotational EMF vector and the current excitation vector, the observer is configured to instruct the inverter to increase the magnitude of the current excitation vector.

Optionally, the observer is configured to use the output signal, E_I_angle, as a torque monitoring system for an open loop driven electrical machine, such that during relatively low levels of load torque, indicated by a large angle between the rotational EMF vector and the current excitation vector, the observer is configured to instruct the inverter to progressively decrease the magnitude of the current excitation vector until the observer output signal, E_I_angle, reaches a value below a threshold value indicating conditions close to pull out conditions, and a smooth transition to closed loop control can be initiated.

Optionally, the control system may be configured to control a synchronous motor.

According to the invention in a second aspect, there is provided an observer for use in a control system for controlling an electrical machine, and configured to operate during a time when open loop control is being used to drive a electrical machine, and further configured to output a signal, E_I_angle, related to the angle between a rotational EMF vector and a current excitation vector provided by an inverter configured to control a electrical machine, wherein the observer is configured to determine the angle by an iterative calculation comprising a summation term, the summation term summing the variation of a quadrature component of a rotational EMF vector relative to an estimated EMF position vector.

According to the invention in a third aspect, there is provided a method for controlling an electrical machine comprising: operating an observer during a time when open loop control is being used to drive a electrical machine, the output of the observer being a signal, E_I_angle, related to the angle between a rotational EMF vector and a current excitation vector provided by an inverter configured to control a electrical machine; determining, by the observer, the angle by an iterative calculation comprising a summation term, the summation term summing the variation of a quadrature component of a rotational EMF vector relative to an estimated EMF position vector; and using the angle output by the observer to update the estimated angular position of the rotational EMF position vector.

According to the invention in a fourth aspect, there is provided a method for controlling an electrical machine operating in an open loop control configuration, the method comprising: determining an angle, E_I_angle, between a rotational EMF vector and a current excitation vector provided for control the electrical machine; and applying one or more control signals to the electrical machine, the control signals being determined in dependence on the E_I_angle.

Optionally, the E_I_angle is determined in an iterative calculation comprising a summation term, the summation term summing the variation of a quadrature component of a rotational EMF vector relative to an estimated EMF position vector, and further comprising updating the EMF position vector based on the E_I_angle.

Optionally, the E_I_angle is determined by the equation
$E\_I\_angle = \Sigma k_i (0 - E_{s\_imag}) - k_p E_{s\_imag}$ where $E_{s\_imag}$ is the quadrature component of the rotational EMF vector, $k_i$ is a gain inversely related to $E_{s\_real}$ and $k_p$ is a gain value.

Optionally, $k_p$ is inversely related to $E_{s\_real}$.

Optionally, applying one or more control signals to the electrical machine comprises transitioning from an open loop control configuration to a closed loop sensorless control configuration.

Optionally, transitioning from an open loop control configuration to a closed loop sensorless control configuration is dependent on the magnitude of E_I_angle being less than or equal to a threshold value represented by a pull-out value, and on a maximum current excitation being already applied to the electrical machine Optionally, applying one or more control signals to the electrical machine comprises decreasing the current excitation to the electrical machine if the E_I_angle is negative and has a magnitude greater than a threshold value represented by a pull-out angle.

Optionally, applying one or more control signals to the electrical machine comprises increasing the current excitation to the electrical machine if the magnitude of the E_I_angle is less than a threshold value represented by a pull-out angle and the maximum excitation current is not already applied to the electrical machine.

Optionally, the increase or decrease of the excitation current is by a predetermined incremental value.

According to the invention in a fifth aspect, there is provided a computer readable medium comprising computer program code configured, when read by a computer, to carry out the methods described above.

According to the invention in a sixth aspect, there is provided an observer for use in a control system for controlling an electrical machine, the observer configured to carry out the methods described above.

According to the invention in a seventh aspect, there is provided a control system for controlling an electrical machine comprising an observer as described above.

According to the invention in an eighth aspect, there is provided an electrical machine comprising a control system as described above.

It will be understood that reference to "current" above relates to electrical current.

BRIEF DESCRIPTION OF THE DRAWINGS

In order that the invention may be more fully understood reference will now be made, by way of example, to the accompanying drawings, in which.

DESCRIPTION

Figure 1:
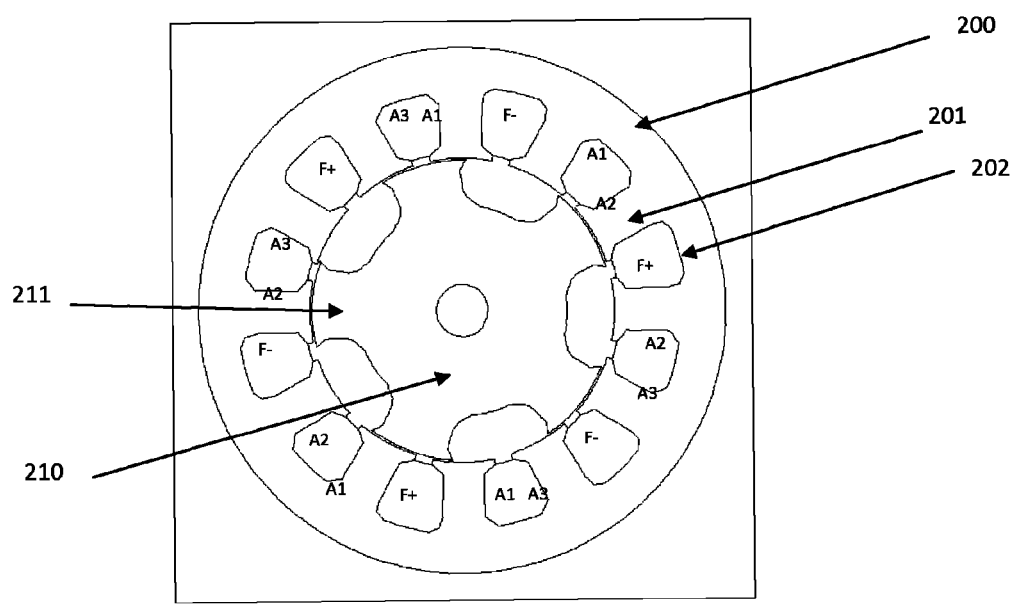
FIGS. 1, 2, 3 and 4 are sections through exemplary machines.

FIG. 1 shows a three phase flux switching machine. A stator 200 has 12 teeth 201 and 12 slots 202 between the teeth. The stator slots carry stator windings. Six of the slots carry field windings, each field slot carrying a current in the opposite direction to the next field slot, to create a six pole magnetic field. The other six slots carry three phase windings or armature windings, $A_1$, $A_2$ and $A_3$. The rotor 210 of the flux switching machine is made of laminated steel and carries no windings or permanent magnets. In this example the rotor has five teeth 211. With field current supplied to the field winding, rotation of the rotor within the stator induces three alternating voltages 120° apart. If the three armature phase windings are connected to a three phase inverter and armature currents are delivered to the windings in synchronism with the induced EMF continuous motoring or generating is achieved. Flux switching motors in which the field winding is replaced by permanent magnets are also possible and can be controlled according to the methods and apparatuses disclosed herein.

Figure 2:
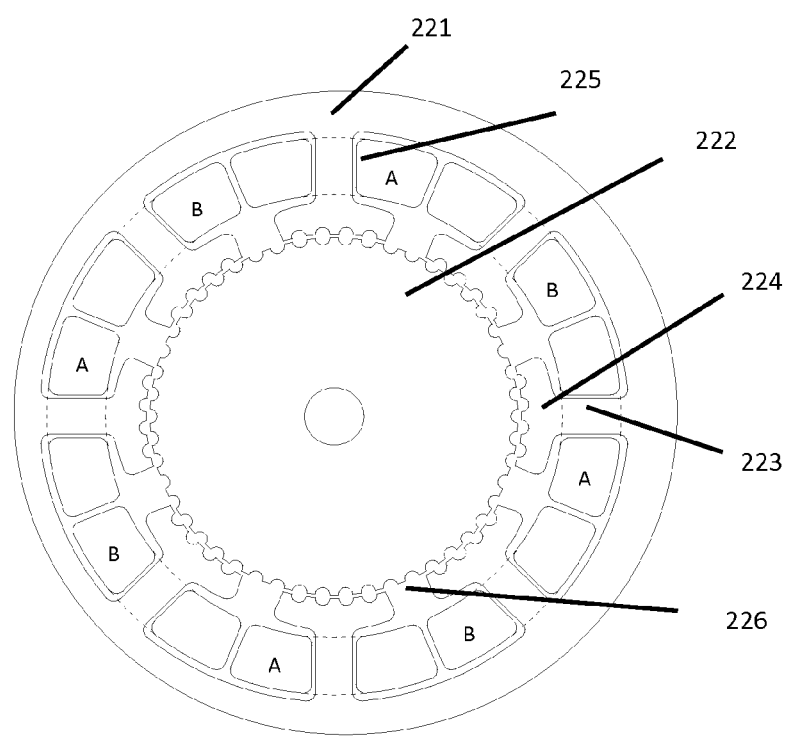

The hybrid stepping motor is a further example of a synchronous motor. Hybrid stepping motors usually have two, three or five phase windings. FIG. 2 illustrates a transverse cross-section through one end of a typical two-phase hybrid stepping motor.

The two-phase hybrid stepping motor of FIG. 2 consists of a stator 221 and a rotor 222, both of which are constructed from stacked laminations of electrical grade steel. The stator has eight poles 223, four for each phase, which widen at the tips to a group of teeth 224. Each stator pole 223 has a winding in the form of a short-pitched phase coil 225. These coils 225 are connected, usually in series, to form two electrically independent motor phase windings A and B. The rotor has a large number of radially spaced teeth 226 (typically 50) at each of its ends, and incorporates a permanent magnet which produces static flux along the axis of the machine. This makes the rotor teeth at one end of the machine all North poles and the rotor teeth at the other end of the rotor all South poles. The teeth 226 at one end of the rotor 222 are offset by half a tooth pitch with respect to the teeth 226 at the other end of the rotor 222. The rotor tooth pitch is the same as the tooth pitch of the stator 221. The EMF induced in the two stator phase windings arises from the rotation of the rotor. The EMF in phase A is 90° phase shifted from the EMF in phase B.

Figure 3:
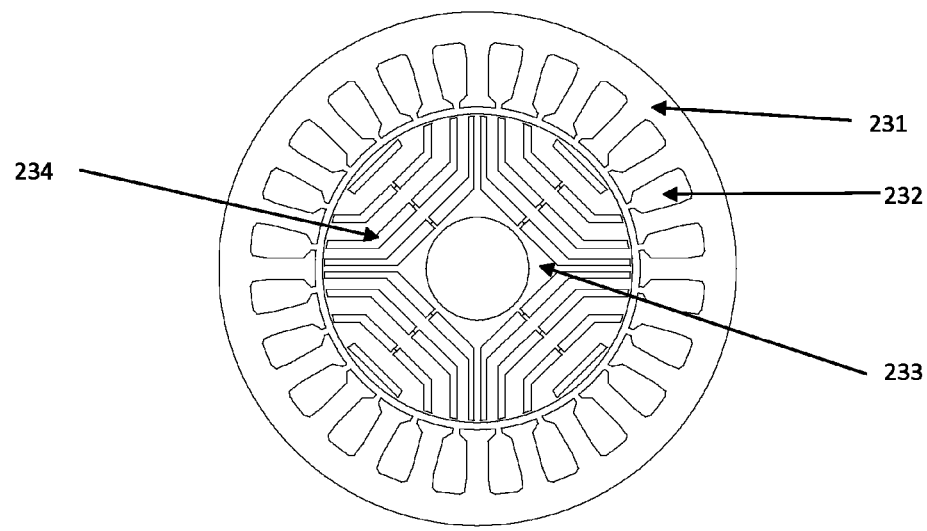

FIG. 3 shows a synchronous reluctance motor with stator 231 and rotor 233. The stator shown has 24 slots 232 though 12 and 36 are also common. The stator slots contain a distributed three phase winding. The rotor 233 is made from laminated steel and contains slotting to act as flux barriers. This creates axes of high and low reluctance such that if the stator winding creates a 4 pole magnetic field the rotor will align the flux barriers so that the stator flux follows a low reluctance path. As the stator field rotates the rotor will follow the field in synchronism. Many different rotor constructions can be used, the aim being to deliver the maximum ratio of reluctance variation. In this motor there is no rotating magnet to induce an EMF in the stator windings; the torque is created by variations in the self inductances of the stator windings and variations in the mutual inductance between phase windings as the rotor rotates.

As an enhancement to the synchronous reluctance motor, permanent magnets can be inserted within the rotor slotting to increase the magnetic saliency further and increase torque production. Such a machine is known as an interior permanent magnet synchronous motor.

Figure 4:
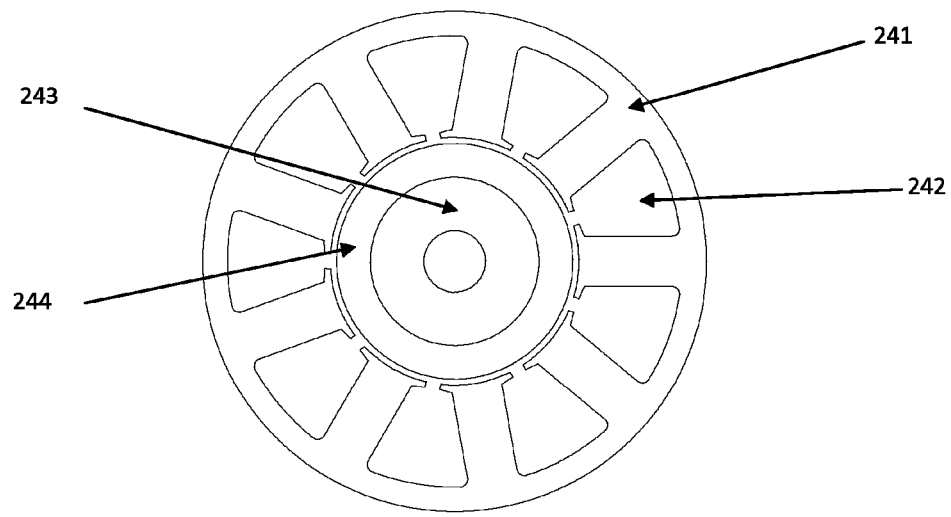

FIG. 4 is a more common permanent magnet synchronous motor. The stator 241 is again made from laminated steel. In this example the stator has 9 teeth interspersed between the 9 slots 242. The stator winding would typically be wound with a short pitch with one coil wound around each tooth and then the three coils spaced at 120° to each other connected together to create each of three phase windings. The rotor 243 has a steel core surrounded by a layer of permanent magnet material. In this example the permanent magnets are magnetised radially to create a six pole magnetic field. Rotation of the rotor induces three EMFs in the stator windings which are displaced in phase by 120° (electrical degrees). Operation as a motor requires an inverter to deliver three alternating armature currents in synchronism with the internal EMF induced in each winding.

All of these machine types have the common feature that they can be modelled as having an internally induced, rotational EMF in the stator windings. The rotational EMF may include components from the rotation of magnets in permanent magnet motors or through the variation in reluctance in rotor designs containing a variable reluctance structure. In synchronous reluctance motors the variation in reluctance as the rotor rotates leads to variations in self inductance of each phase winding and variations in mutual inductance between windings. The term "rotational EMF" as used herein encompasses any time varying combination of changing fluxes, due to a phase winding's own current (self inductance), the currents in other windings (mutual inductance) or a rotating permanent magnet. In certain interior permanent magnet motors the rotational EMF will comprise components from variations in both permanent magnet flux and reluctance as the rotor rotates. In the flux switching motor the rotational EMF is induced by the rate of change of mutual coupling with a stationary field winding or stationary field magnets.

In the mathematical analysis of electrical machines of these types it is common to analyse the machine totally in electrical cycles and electrical degrees. When this is done the analysis is similar for all synchronous machines of any type and pole numbers. In such analysis it is common to transform the statically orientated, time varying quantities of each stator phase winding into a single system of rotating vectors, rotating at the same speed as the average speed of the rotor.

Figure 5:
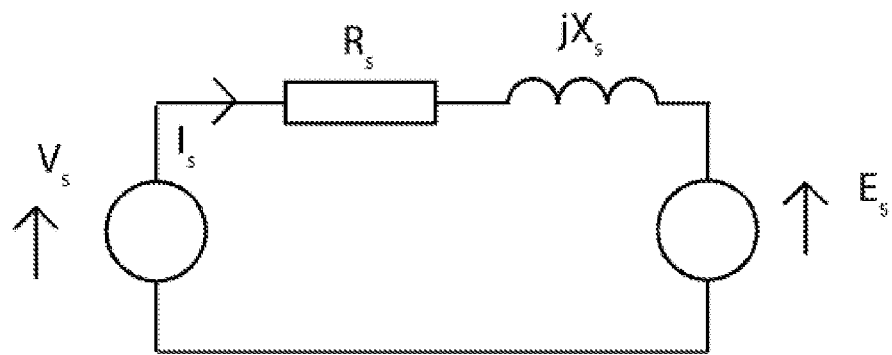
FIG. 5 shows an equivalent circuit of a machine in the rotating reference frame.

Using the electrical quantities on a rotating reference frame containing components of all the phase windings of the motor an equivalent circuit is shown in FIG. 5. The stator voltage equation, in the rotating reference frame, is given by:

$$\overline{V}_s = \overline{E}_s + j\overline{I}_s X_s + \overline{I}_s R_s \quad (1)$$

where $\overline{V}_s$, $\overline{E}_s$, $\overline{I}_s$ are the vector quantities of the stator voltage, rotational EMF and stator current with respect to the rotating reference frame; $X_s$ is the reactance of the stator phase winding and $R_s$ is the resistance of the stator phase windings. $X_s$ may also be a complex vector with different in-phase and out-of-phase components. This is common in motors with significant variation in reluctance (and hence stator inductance) at different rotor orientations. An example of such a motor where reactance $X_s$ could have different quadrature components would be an interior permanent magnet synchronous motor or a synchronous reluctance motor. However, since the rotating reference frame rotates with the rotor, the components of $X_s$ do not vary significantly with time and the term $j\overline{I}_s X_s$ does not contribute to torque production.

The torque produced by the motor is given by $$T = \frac{\overline{I}_s * \overline{E}_s \cos(\gamma)}{\omega} \quad (2)$$

where $\gamma$ is the angle between the rotational EMF vector and the stator current and $\omega$ is the rotational velocity of the rotor in mechanical radians per second.

Operation of the motor with maximum torque per ampere is achieved if $\gamma=0$ and the $\overline{E}_s$ and $\overline{I}_s$ vectors are coincident. When, $\gamma=0$, the rotational EMF vector $\overline{E}_s$ is in phase with the stator current vector and the torque is again given by equation (2) which is now maximum and equal to $$T = \frac{\overline{I}_s * \overline{E}_s}{\omega} \quad (3)$$

Figure 6:
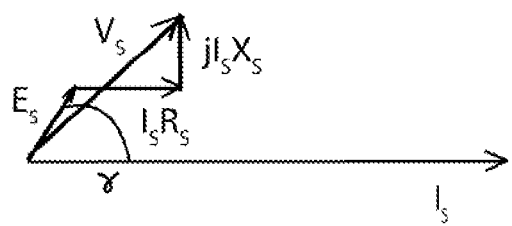
FIG. 6 shows a vector diagram in the rotating reference frame of a motor when it is starting and still at low speed and the magnitude of the EMF vector is relatively small.

The angular position of the EMF vector with respect to the stator current vector therefore determines the torque production of the motor. FIG. 6 shows a vector diagram showing one possible relationship between stator voltage vectors calculated on the rotating reference frame.

In the example illustrated by FIG. 6, the motor is just starting and the current vector is driven in an open loop manner at a preset level. In order for the open loop control to guarantee that the rotor follows the excitation and does not pull out or stall, the current level must be sufficiently high to ensure that the load angle of the motor is less than 90° where load angle is the angle between stator and rotor fluxes. As the EMF vector is typically 90° ahead of the rotor flux vector, the angle between the current and the EMF vector must be greater than zero, such that the $\overline{E_s}$ vector leads the $\overline{I_s}$ vector. It is convenient to define an angle called the E_I_angle which is the angle between the EMF vector and the current vector. In FIG. 6 the E_I_angle is negative and equal to $-\gamma$. FIG. 6 represents a condition when the motor is starting and still at low speed, the magnitude of the EMF vector is relatively small and the torque is given by equation (2).

Figure 7:
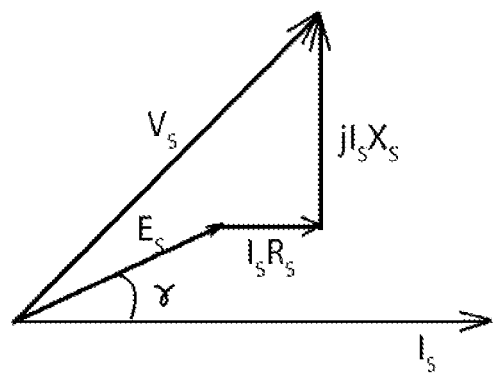
FIG. 7 shows a further vector diagram of a motor running at low speed with a larger magnitude of EMF vector and increased load.

As the motor accelerates, the EMF vector increases in magnitude and the torque required to maintain the motion usually increases. The load angle will tend to increase which acts to rotate the EMF vector closer to the driven current vector. The E_I_angle therefore becomes less negative and such a situation is represented by the vector diagram in FIG. 7.

Further increases in rotor speed and/or increases in load torque would bring the motor to operate close to pull out torque where the load angle is 90° and any further increase in load will lead to a loss of synchronism between stator and rotor. This situation is represented by FIG. 8.

Figure 8:
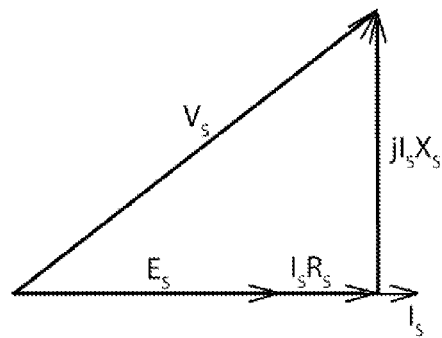
FIG. 8 shows a further vector diagram of a motor running close to pull out.

In the example illustrated by FIG. 8, the $\overline{E_s}$ and $\overline{I_s}$ vectors are coincident; $\gamma=0$, the rotational EMF vector $\overline{E_s}$ is in phase with the stator current vector and the torque is now maximum for the given excitation current level and is given by equation (3). In a motor using open loop starting, driving the current vector at a preset magnitude and frequency (or accelerating frequency ramp), the condition of exceeding pull out torque must be recognised before it happens. However, the situation represented by FIG. 8 is also the ideal time to transfer from open loop driven control to a closed loop, self commutating controller based on back EMF sensing or other sensorless detection means. The motor has naturally reached maximum torque per ampere operation and the transfer to closed loop control can be achieved without a significant disturbance in the controller or a sudden acceleration.

The operation of a motor using an electronic monitoring system as disclosed herein allows the E_I_angle to be monitored from starting and a condition prior to pull out can be detected so that the transfer to closed loop sensorless control can be made with minimal disturbance. In this way the destabilising effect of entering closed loop position control at a time when the stator excitation is well in excess of the level which delivers maximum torque per ampere is avoided.

The calculation of the E_I_angle will now be explained in more detail. A rotating stator reference frame is chosen to be in line with the most recent estimate of the EMF vector. At starting the estimated position of the EMF vector can be assumed to be in line with the current vector or at an initial position ahead of the current vector. Two quadrature components of the stator current vector $\overline{I_s}$ in the rotating stator reference frame are $I_{s\_real}$ and $I_{s\_imag}$. The component $I_{s\_real}$ is the effective component of the stator current in line with the rotating stator reference frame (the estimated EMF vector position), and $I_{s\_imag}$ is the effective component of the stator current at right angles (orthogonal) to the rotating stator reference frame.

The terms direct and quadrature axes are not used in this description to avoid confusion with rotor orientated controllers which require the stator currents to be mapped onto the direct and quadrature rotor axes.

Since $\overline{V_s}, \overline{E_s}, \overline{I_s}$ all have real and imaginary parts calculated on the rotating reference frame following the estimated EMF vector position. Equation (1) can be rewritten into a real part (in phase with the estimated EMF vector) and an imaginary part (orthogonal to the estimated EMF vector):

$$V_{s\_real}=E_{s\_real}+I_{s\_real}*R_s-I_{s\_imag}*X_s \quad (4)$$

and $$V_{s\_imag}=E_{s\_imag}+I_{s\_imag}*R_s+I_{s\_real}*X_s \quad (5)$$

As described earlier the values of $X_s$ in equations (4) and (5) may not be identical if a motor such as a synchronous reluctance motor or interior permanent magnet motor is used where the stator inductance may be different in real and imaginary axes.

These equations can be rearranged to give equations for the real and imaginary components of the EMF vector, $\overline{E_s}$, $$E_{s\_real}=V_{s\_real}-I_{s\_real}*R_s+I_{s\_imag}*X_s \quad (6)$$

$$E_{s\_imag}=V_{s\_imag}-I_{s\_imag}*R_s-I_{s\_real}*X_s \quad (7)$$

Given suitable values for $R_s$ and $X_s$ and knowing the magnitude of the voltage vector delivered through the inverter, these equations can be evaluated in real time during rotation of the motor to update the estimate of the real and imaginary components of the rotational EMF vector in the rotating reference frame. The magnitude of the voltage vector can either be estimated from the commanded pulse width modulation duty cycles in the inverter or be monitored at the outputs of the inverter.

Whilst, the above equations are similar to those disclosed in prior art documents such as PCT/EP2009/065281, controlling a motor as disclosed herein uses the result of equation (6) and (7) in a very different way. Instead of using arcTan functions or ratio functions to calculate angles, an observer is used to estimate and monitor E_I_angle. The observer equation implemented is given by:

$$E\_I\_angle=\Sigma k_i(0-E_{s\_imag})-k_p E_{s\_imag} \quad (8)$$

where the first term represents a summation of errors of the imaginary or quadrature component of the EMF vector compared to zero calculated in each iteration of the loop (usually each PWM cycle). The methods and apparatuses disclosed herein therefore incorporate an observer, operating during a time when open loop control is being used to drive a synchronous motor, the output of the observer being the signal, E_I_angle, related to the angle between a rotational EMF vector and the current excitation vector, the observer determining the angle by an iterative calculation incorporating a summation term, the summation term summing the variation of the quadrature component of a rotational EMF vector relative to an estimated EMF position vector.

The coefficient $k_i$ can be thought of as a scaling or gain and may be inversely related to $E_{s\_real}$. The second term allows a more rapid correction of the observer taking account of the most recent calculation of the error in the estimated imaginary component of the EMF vector. The coefficient $k_p$ can be thought of as a proportional gain and may be inversely related to $E_{s\_real}$.

Since in open loop control the excitation or current vector position ($Current_{position}$) is controlled by the inverter to follow a specific magnitude and frequency, the result of the E_I_angle observer is used to update the position of the estimated EMF position vector according to $$\text{EMF}_{position} = \text{Current}_{position} - E\_I\_\text{angle} \quad (9)$$

This updated angular position for the estimated rotational EMF vector position, $\text{EMF}_{position}$, is used as the estimated EMF vector position and rotating reference frame for the next iteration of the observer. The observer is therefore using a summation of the quadrature components of the EMF vector relative to an estimated position to iteratively converge on an improved estimated EMF vector position and an improved estimate for E_I_angle. In this way the limitations in the prior art are overcome and it is possible to extract reliable information from very low value signals while the magnitude of the EMF vector is small during open loop excitation.

The observer output is E_I_angle. Implementation of the observer as an update to the EMF vector position results in the error in the EMF vector position, calculated in arbitrary units being converted into angular units without need for accurate calculations in correctly scaled units using a non-linear arcTan function. Since the observer output is automatically scaled in units of electrical degrees it is now straightforward to use the observed value of E_I_angle to judge the loading on the motor relative to its maximum torque. If the E_I_angle starts to approach the pull out value (E_I_angle becomes small and negative or even zero) then the observer can indicate the need to change to an alternative control strategy where closed loop sensorless methods can be used.

Figure 9:
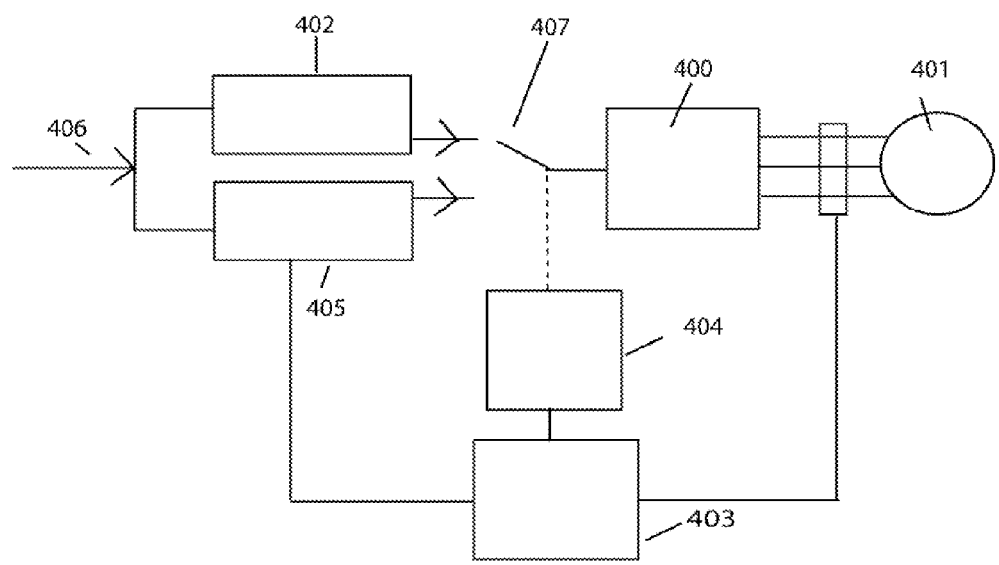
FIG. 9 shows a block diagram of the component parts of an electronic control system.

The block diagram in FIG. 9 shows the component parts of an electronic control system. An inverter 400 is connected to an electronically controlled motor 401. The module 402 sets the excitation frequency and current magnitude according to the open loop controller parameters. The open loop controller module 402 may also receive signals 406 from the user about speed demand, torque demand, acceleration rates or other requirements. The motor currents are measured and the measurements are used in block 403 to estimate the real and imaginary components of the EMF vector in relation to the latest estimate of the E_I_Angle and $\text{EMF}_{position}$ from the Observer block 404. The observer block 404 implements equations (8) and (9). The observer block 404 also monitors the size of the E_I_angle to determine if control should be switched from open loop to closed loop using the control switch 407. Block 405 implements closed loop control based on the EMF measurements from block 403 or otherwise according to any of the methods now common in the art.

Figure 10:
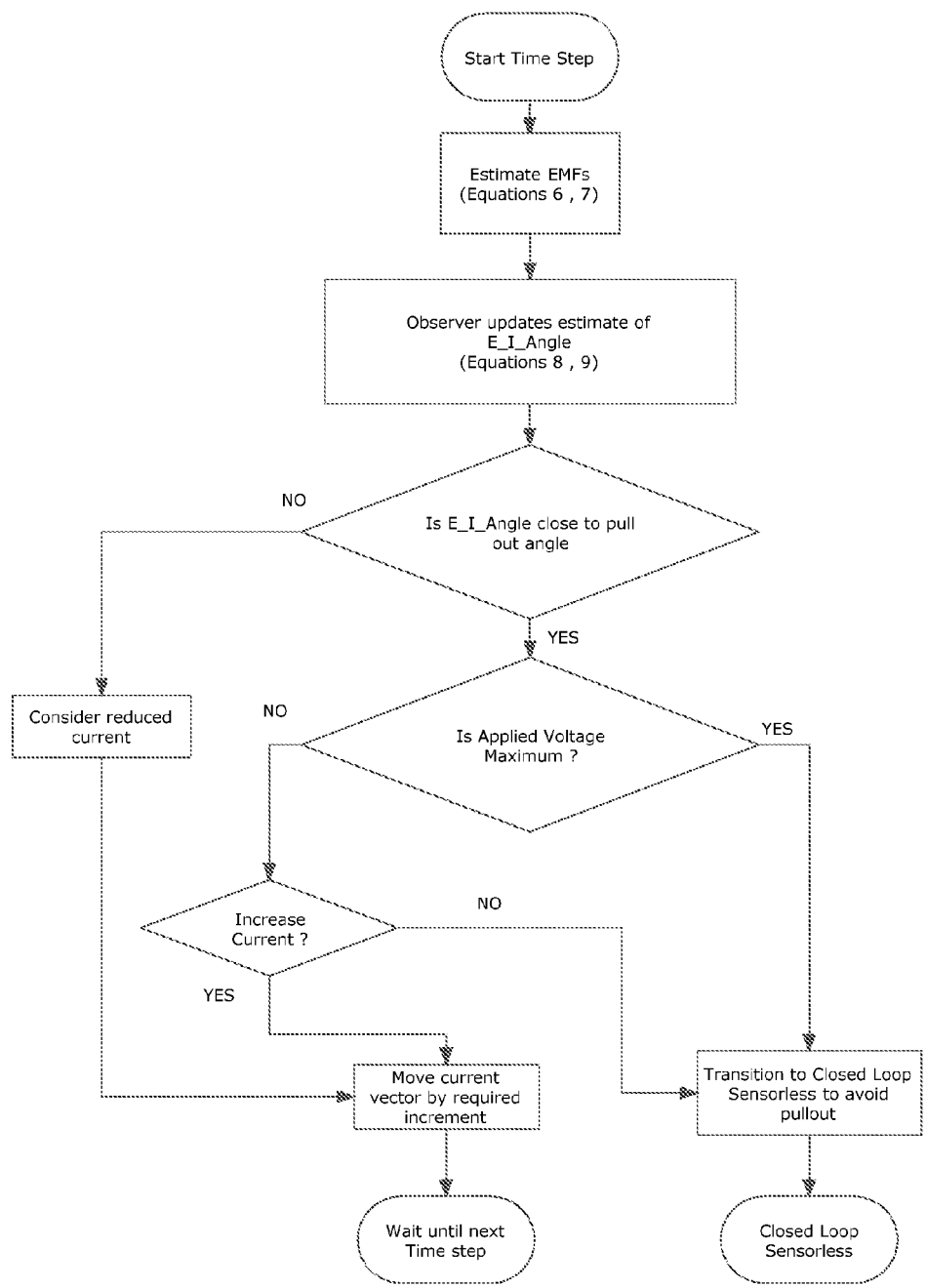
FIG. 10 shows a flow chart of a decision process occurring in an electronic control system.

The operation of the observer block 404 can be explained with the aid of the flowchart in FIG. 10. The flowchart shows one execution or time step of the open loop driven system. The execution uses EMF estimation according to equations (6) and (7). In particular equation (7) determines the sign of the error in the last observed value of E_I_angle. Equation (8) is useful to modify the gain multipliers $k_i$ and $k_p$ such that they can vary inversely with the real component of the EMF. However, in experiments it has been found that the controller is very robust and dynamic variation of these multipliers is not always necessary allowing the controller to be kept very simple allowing it to be implemented at low cost. The observer output of E_I_angle is monitored to ensure that it does not approach the pull out torque condition near to zero.

If E_I_angle is negative, away from the pull out region, it is clear that the open loop current is more than enough to deliver the torque output at the present load and speed. Under these conditions the current could be reduced before moving the excitation angle on to the position of the next PWM cycle.

If E_I_angle is small, approaching the pull out region, the open loop current is only just enough to deliver the torque output at the present load and speed. Under these conditions the current could be increased before moving the excitation angle on to the position of the next PWM cycle. However, if the current cannot be increased because the applied voltage is already at a maximum level or the current level is appropriate for the system, the observed E_I_angle being close to pull out conditions indicates the ideal point to switch to a closed loop sensorless control scheme.

Conventional controllers drive the system in low speed with no rotor position monitoring system. A control system as disclosed herein therefore monitors the rotor position while the system is driven.

The advantages of the control system are that it can be used to detect when to transfer to closed loop position control so that the transfer is seamless, and that it can be used to detect a stall condition and it can be used to modulate the driven current within levels to limit the use of using excessive currents.

Implementation of the methods and apparatuses herein disclosed has been described with reference to electric motors with rotors rotating relative to a stator. They can be applied directly to linear electric motors to control linear travel velocities under conditions of changing loads. Such motors still have electrical cycles which can be modelled as systems of rotating vectors.

The observer disclosed herein can also be used to monitor the E_I_angle in a generator operating in an open loop manner. In this case the angles all change in sign relative to the values discussed in this description.

The skilled person will be able to envisage further embodiments without departing from the scope of the appended claims.

The invention claimed is:

1. A control system for an electrical machine, and comprising:
an observer configured to operate during a time when open loop control is being used to drive an electrical machine, and further configured to output a signal, E_I_angle, related to the angle between a rotational EMF vector and a current excitation vector provided by an inverter configured to control an electrical machine,
wherein the observer is configured to determine the angle by an iterative calculation comprising a summation term, the summation term summing the variation of a quadrature component of the rotational EMF vector relative to an estimated EMF position vector,
and wherein the controller system is configured to use the angle output by the observer to update the estimated angular position of the rotational EMF position vector.

2. The control system according to claim 1, wherein the observer is configured to use the output signal, E_I_angle, to determine the time of transition to closed loop control, when the observer output signal reaches a value below a threshold value indicating conditions close to pull out conditions.

3. The control system according to claim 1, wherein the observer is configured to use the output signal, E_I_angle, as a torque monitoring system for an open loop driven electrical machine, such that during relatively low levels of load torque, indicated by a large angle between the rotational EMF vector and the current excitation vector, the observer is configured to instruct the inverter to decrease the magnitude of the current excitation vector.

4. The control system according to claim 1, wherein the observer is configured to use the output signal, E_I_angle, as a torque monitoring system for an open loop driven electrical machine, such that during relatively high levels of load torque, indicated by a small angle between the rotational EMF vector and the current excitation vector, the observer is configured to instruct the inverter to increase the magnitude of the current excitation vector.

5. The control system according to claim 1, wherein the observer is configured to use the output signal, E_I_angle, as a torque monitoring system for an open loop driven electrical machine, such that during relatively low levels of load torque, indicated by a large angle between the rotational EMF vector and the current excitation vector, the observer is configured to instruct the inverter to progressively decrease the magnitude of the current excitation vector until the observer output signal, E_I_angle, reaches a value below a threshold value indicating conditions close to pull out conditions, and a smooth transition to closed loop control can be initiated.

6. The control system according to claim 1, configured to control a synchronous motor.

7. An observer for use in a control system for controlling an electrical machine, and configured to operate during a time when open loop control is being used to drive a electrical machine, and further configured to output a signal, E_I_angle, related to the angle between a rotational EMF vector and a current excitation vector provided by an inverter configured to control a electrical machine,
wherein the observer is configured to determine the angle by an iterative calculation comprising a summation term, the summation term summing the variation of a quadrature component of a rotational EMF vector relative to an estimated EMF position vector.

8. A control system for controlling an electrical machine comprising an observer according to claim 7.

9. An electrical machine comprising a control system according to claim 8.

10. A method for controlling an electrical machine comprising:
operating an observer during a time when open loop control is being used to drive a electrical machine, the output of the observer being a signal, E_I_angle, related to the angle between a rotational EMF vector and a current excitation vector provided by an inverter configured to control a electrical machine;
determining, by the observer, the angle by an iterative calculation comprising a summation term, the summation term summing the variation of a quadrature component of a rotational EMF vector relative to an estimated EMF position vector; and
using the angle output by the observer to update the estimated angular position of the rotational EMF position vector.

11. A method for controlling an electrical machine operating in an open loop control configuration, the method comprising:
determining an angle, E_I_angle, between a rotational EMF vector and a current excitation vector provided for control the electrical machine;
applying one or more control signals to the electrical machine, the control signals being determined in dependence on the E_I_angle; and
updating the EMF position vector based on the E_I_angle;
wherein the E_I_angle is determined in an iterative calculation comprising a summation term, the summation term summing the variation of a quadrature component of a rotational EMF vector relative to an estimated EMF position vector.

12. The method according to claim 11, wherein the E_I_angle is determined by the equation E_I_angle=$\Sigma k_i(0-E_{s\_imag})-k_p E_{s\_imag}$ where $E_{s\_imag}$ is the quadrature component of the rotational EMF vector, $k_i$ is a gain inversely related to $E_{s\_real}$ and $k_p$ is a gain value.

13. The method according to claim 12, wherein $k_p$ is inversely related to $E_{s\_real}$.

14. The method according to claim 11, wherein applying one or more control signals to the electrical machine comprises transitioning from an open loop control configuration to a closed loop sensorless control configuration.

15. The method according to claim 14, wherein transitioning from an open loop control configuration to a closed loop sensorless control configuration is dependent on the magnitude of E_I_angle being less than or equal to a threshold value represented by a pull-out value, and on a maximum current excitation being already applied to the electrical machine.

16. The method according to claim 11, wherein applying one or more control signals to the electrical machine comprises decreasing the current excitation to the electrical machine if the E_I_angle is negative and has a magnitude greater than a threshold value represented by a pull-out angle.

17. The method according to claim 16, wherein the increase or decrease of the excitation current is by a predetermined incremental value.

18. The method according to claim 11, wherein applying one or more control signals to the electrical machine comprises increasing the current excitation to the electrical machine if the magnitude of the E_I_angle is less than a threshold value represented by a pull-out angle and the maximum excitation current is not already applied to the electrical machine.

19. A non-transitory computer readable medium comprising computer program code configured, when read by a computer, to carry steps comprising:
determining an angle, E_I_angle, between a rotational EMF vector and a current excitation vector provided for control the electrical machine;
applying one or more control signals to the electrical machine, the control signals being determined in dependence on the E_I_angle; and
updating the EMF position vector based on the E_I_angle;
wherein the E_I_angle is determined in an iterative calculation comprising a summation term, the summation term summing the variation of a quadrature component of a rotational EMF vector relative to an estimated EMF position vector.

* * * * *